United States Patent [19]
Mattes et al.

[11] Patent Number: 5,118,134
[45] Date of Patent: Jun. 2, 1992

[54] METHOD AND APPARATUS FOR PROTECTING MOTOR VEHICLE OCCUPANTS

[75] Inventors: Bernhard Mattes, Sachsenheim; Klaus Reischle, Ditzingen-Schoeckingen, both of Fed. Rep. of Germany

[73] Assignee: Robert Bosch GmbH, Stuttgart, Fed. Rep. of Germany

[21] Appl. No.: 628,227

[22] Filed: Dec. 14, 1990

[30] Foreign Application Priority Data

Feb. 22, 1990 [DE] Fed. Rep. of Germany ....... 4005598

[51] Int. Cl.$^5$ ............................................. B60R 21/32
[52] U.S. Cl. .................................... 280/735; 180/268; 180/282
[58] Field of Search .............. 280/730, 731, 732, 734, 280/735; 180/268, 282

[56] References Cited

U.S. PATENT DOCUMENTS 4,258,931  3/1981  Lee et al. ............................ 280/734
4,836,024  6/1989  Woehrl et al. ...................... 280/735

FOREIGN PATENT DOCUMENTS 3803426   8/1989  Fed. Rep. of Germany .
3809074  10/1989  Fed. Rep. of Germany .
37430599  2/1990  Fed. Rep. of Germany .

*Primary Examiner*—Kenneth R. Rice
*Attorney, Agent, or Firm*—Kenyon & Kenyon

[57] ABSTRACT

In a process for protecting motor vehicle occupants, the acceleration of the motor vehicle is determined and safety means which protect the motor vehicle occupant are activated when a specified limiting acceleration value is exceeded. To optimally release the safety means, the sitting position of the motor vehicle occupant and/or the relative velocity of the occupant with respect to the passenger cabin of the motor vehicle are determined by position sensor using measuring techniques. The safety means are activated when the sitting position of the occupant deviates from a nominal position and/or the relative velocity of the occupant exceeds a specified limiting value.

9 Claims, 2 Drawing Sheets

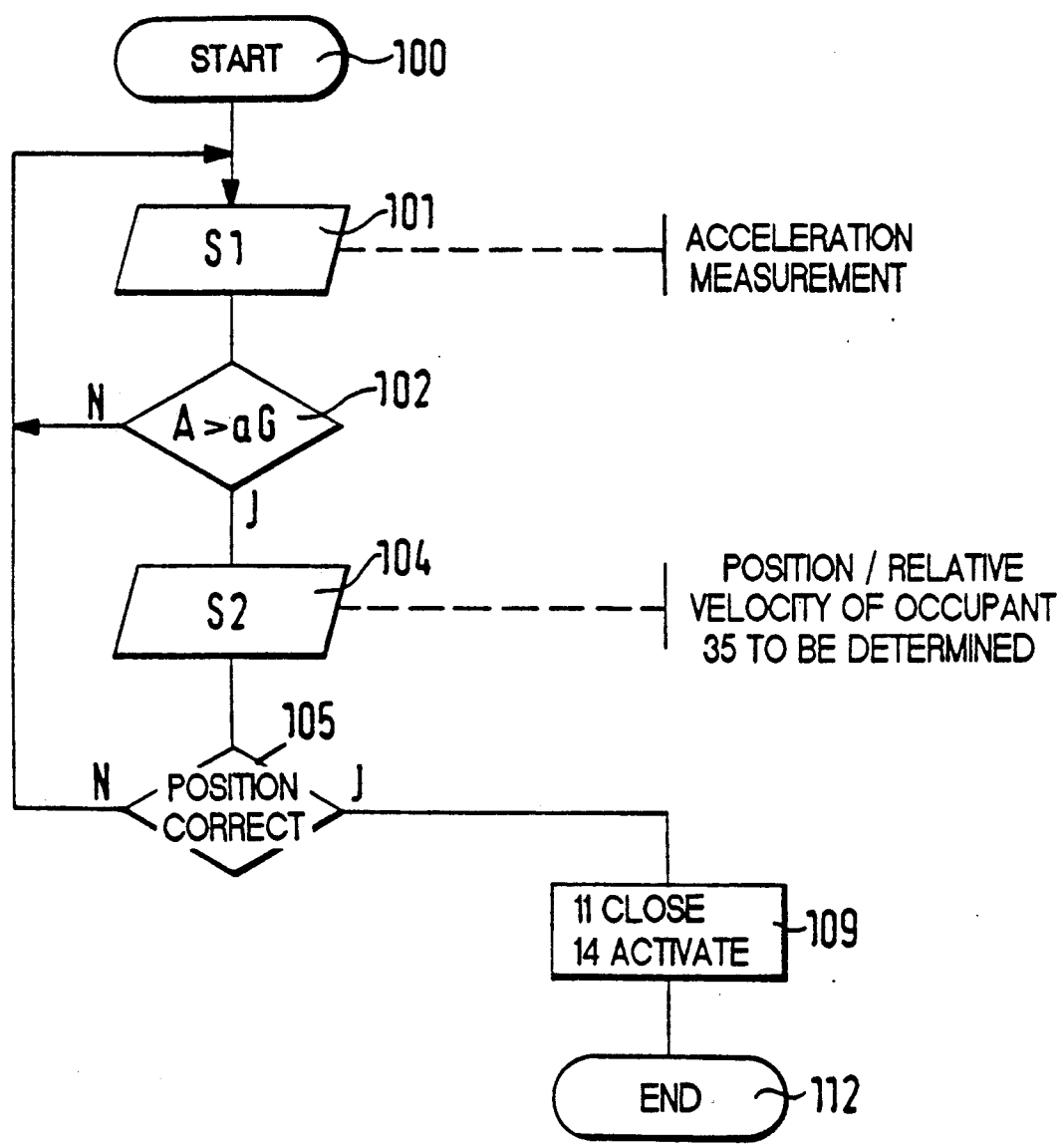

METHOD AND APPARATUS FOR PROTECTING MOTOR VEHICLE OCCUPANTS

FIELD OF THE INVENTION

The present invention relates to methods and apparatus for protecting motor vehicle occupants and, in particular, to methods and apparatus for determining the acceleration of a motor vehicle and activating safety means when a specified acceleration value is exceeded.

BACKGROUND INFORMATION

A typical method for effectively controlling a safety system is shown in German Published Patent Application No. DE-OS 38 03 426. During an accident, the forward displacement of a vehicle occupant is calculated using the signal from an accelerometer. If the forward displacement of an occupant, derived through computation, exceeds a specified value, a safety device (such as an inflatable air bag) is activated. A disadvantage of this system is that the criterion for the tripping action is based on a fictitious occupant position. The fictitious occupant position may not necessarily conform to the actual sitting position of the occupant, thus decreasing the accuracy in the control of the safety device.

Another known system for motor vehicles, which includes the use of an inflatable protective impact cushion, is disclosed in German Published Patent Application No. DE-OS 38 09 074. In accordance with this known system, the sitting position (center of gravity) of the driver is determined through the use of pressure sensors arranged on the track of the motor vehicle seat. Based on the information from the pressure sensors, the protective impact cushion is only partially inflated when the vehicle occupant is positioned in a location relatively close to the front of the motor vehicle.

Another known method is disclosed in German Patent Application No. DE-P 37 43 059.9 which proposes using measurement techniques to detect the actual sitting position of a motor vehicle occupant. Such measurements are obtained through the use of a suitable sensor, such as an ultrasonic transmitting receiver or a passive infrared sensor. Based on the detected sitting position of the occupants, particularly the position of the passenger, the decision to fully or only partially inflate an inflatable air bag, provided for the passenger, is made. The determination to activate the safety means is based on the measured limiting acceleration value. This method does not use the sitting position of the motor vehicle occupant as part of the tripping criterion for the safety means. Rather, the sitting position is used only to determine if the safety means are to be partially or fully inflated.

It is an object of the present invention, therefore, to overcome the problems of known methods and apparatus for protecting motor vehicle occupants.

ADVANTAGES OF THE INVENTION

A major advantage of the present invention is that it detects and utilizes the dangerous forward displacement of a motor vehicle occupant, in determining when to activate the safety means of the motor vehicle. This forward displacement of a vehicle occupant is the most important indicator as to whether the safety of the occupant is in danger. The forward displacement of the motor vehicle occupant is detected using measurement techniques. The measured displacement is utilized as the criterion for tripping the safety means. This substantially prevents the false release of the safety means and, thus, the associated high service costs thereof, particularly when the output signals of an existing acceleration sensor assume high values, which point to the occurrence of an accident, but when no accident has actually occurred, and there is no forward displacement of the passenger.

One advantage of the method and apparatus of the present invention, is that it improves the operational reliability of the safety system while increasing the likelihood of protecting the motor vehicle occupant in the event of an accident. This is achieved because the safety means can be optimally activated when the output signals of the acceleration sensor assume high values indicating the occurrence of an accident, and the forward displacement of the occupant likewise indicates high acceleration values.

Instead of detecting the sitting position of the vehicle occupant, the relative velocity of the vehicle occupant is preferably determined indirectly by successive measurements of the respective sitting positions of the motor vehicle occupant. Such measurements can be used as a criterion for tripping the safety means. A particularly reliable tripping criterion can be obtained by evaluating both the sitting position and the relative velocity of the motor vehicle occupant.

When an accident takes place, the head and the upper body of a motor vehicle occupant are particularly endangered. Therefore, instead of monitoring the sitting position, it is particularly useful to determine and use the position and/or relative velocity of the upper body and head of the occupant as part of the tripping criterion.

In addition to an acceleration sensor, a control instrument for evaluating the signals from the acceleration sensor, and the safety means for protecting the motor vehicle occupant, one particularly advantageous embodiment of the present invention includes at least one position sensor for determining the sitting position of the motor vehicle occupant.

In one embodiment of the present invention, at least one light transmitter and one light receiver are provided as a position sensor. The light transmitter and receiver are used to define at least one measuring section running at right angles to the direction of motion of the motor vehicle occupant.

In another embodiment of the present invention, a measuring section is formed by an ultrasonic sensor and an ultrasonic receiver, which are particularly well suited for determining the sitting position of the motor vehicle occupant. The ultrasonic sensor and the ultrasonic receiver are arranged with respect to the motor vehicle occupant in such a way, that the ultrasonic energy from the ultrasonic transmitter, reflected off the motor vehicle occupant, reaches the ultrasonic receiver.

In an arrangement which provides particular ease of assembly, the position sensor is configured in the dashboard of the motor vehicle. Optionally, however, the position sensor can also be configured in the head rest of the motor vehicle.

Other advantages of the method and apparatus of the present invention will become apparent in view of the following detailed description and drawings taken in connection therewith.

BRIEF DESCRIPTION OF THE DRAWINGS

FIG. 3 is a flow chart illustrating conceptually the steps in the operation of the apparatus of FIG. 1.

DETAILED DESCRIPTION

Figure 1:
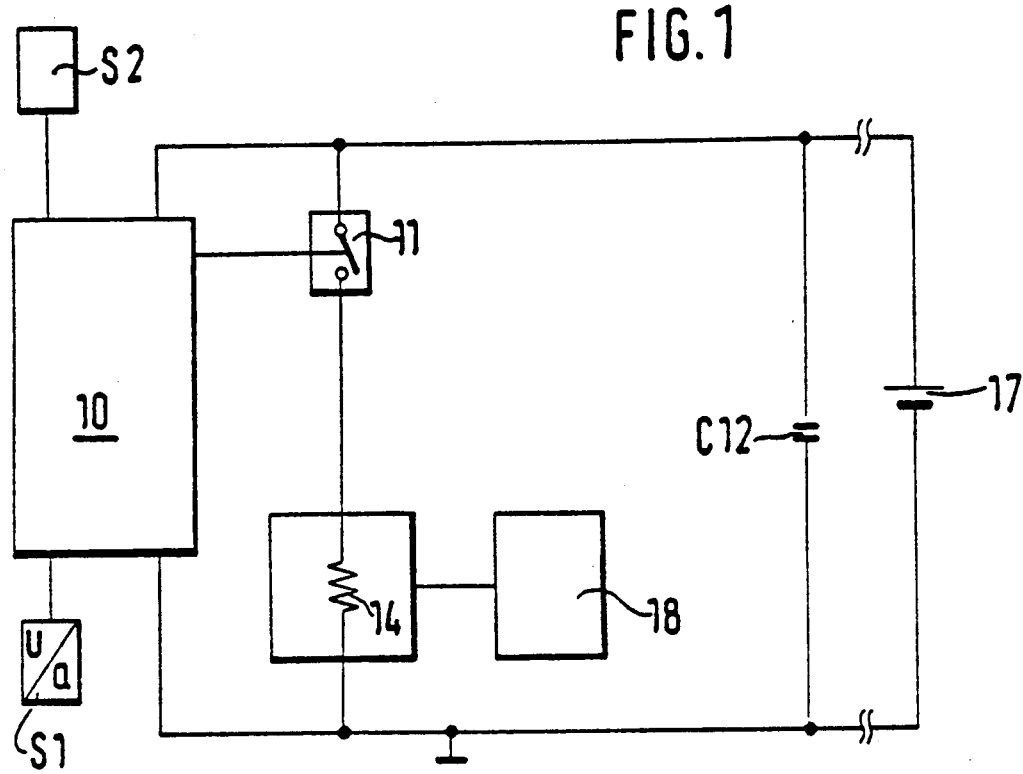
FIG. 1 is a schematic illustration of an apparatus embodying the present invention.

An apparatus embodying the present invention is illustrated in FIG. 1 and comprises a control instrument 10 which has several input and output terminals. A first input terminal of the control instrument 10 is coupled to the output terminal of an acceleration sensor S1. The acceleration sensor S1 generates a voltage u proportional to the acceleration a, or emits a voltage signal at the output only when a defined acceleration threshold is exceeded. A second input terminal of the control instrument 10 is coupled to the output terminal of a position sensor S2. The position sensor S2 detects the position of a motor vehicle occupant using measuring techniques, as described further below.

A first output terminal of the control instrument 10 is coupled to a grounded connection, as shown in FIG. 1. A second output terminal of the control instrument 10 is coupled to a first terminal of a capacitor C12 and a voltage source 17. The capacitor C12 and the voltage source 17 are in turn coupled to the grounded connection through their second terminals, as shown in FIG. 1.

The second output terminal of the control instrument 10 is also coupled to a first pole of a circuit element 11, whose second pole is, in turn, coupled to a first terminal of a firing element 14. A second terminal of the firing element 14 is coupled to the grounded connection, as shown in FIG. 1. The firing element 14 is operatively coupled to a safety means 18 for protecting motor vehicle occupants.

The safety means 18 comprises, for example, an inflatable air bag and/or a belt tightener. In this charge (not shown) is able to be activated by means of the firing element 14. The firing element 14 generates the quantities of gas required to inflate the air bag. Preferably, ignition tablets, which can be heated by means of current flow therethrough, are used as the firing element 14. The current flow through the firing element 14 occurs upon closing of the circuit element 11. The circuit element 11 is coupled to a third output terminal of the control instrument 10.

Figure 2:
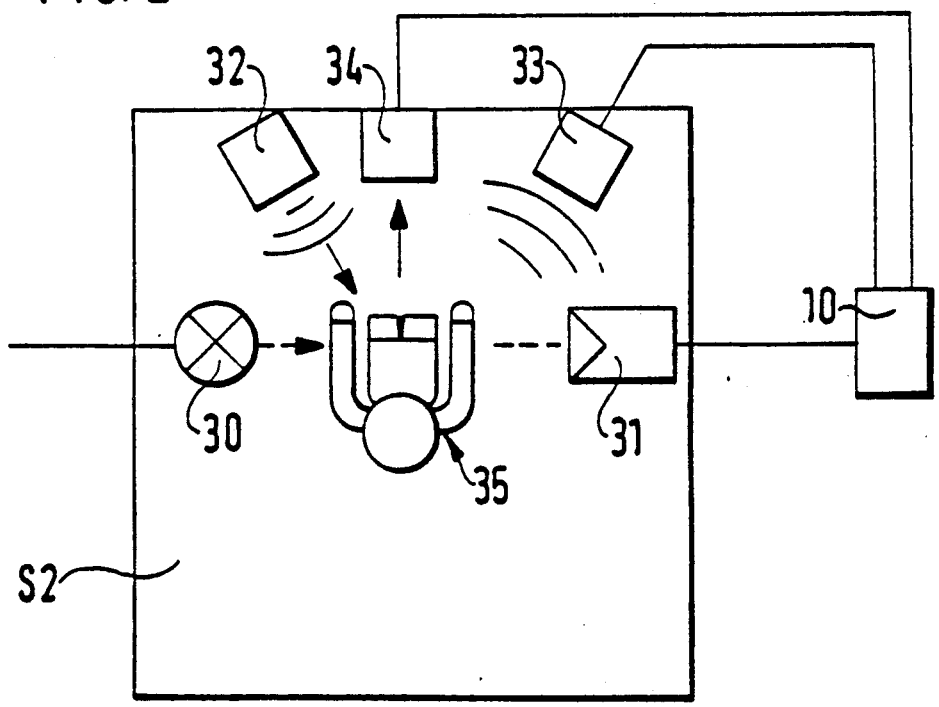
FIG. 2 is a schematic illustration of several position sensors of the apparatus of FIG. 1.

FIG. 2 illustrates several preferred embodiments of position sensors S2 coupled to the control instrument 10. The position sensor S2 serves to determine the position of the motor vehicle occupant 35 and/or to determine the velocity of the motor vehicle occupant 35 relative to the passenger cabin of the vehicle, when forces cause the occupant to accelerate away from the seat.

A first exemplified embodiment of a position sensor S2 comprises at least one light transmitter 30 and one light receiver 31. The light receiver 31 is coupled to the control instrument 10. As shown in FIG. 2, the light transmitter 30 and light receiver 31 define at least one measuring section running at right angles to the direction of motion of the occupant 35. The arrangement of at least one such measuring section enables the respective position of the motor vehicle occupant 35 to be determined. Preferably, however, several such measuring sections are provided, and the position determination is made by the position sensor S2 using measuring techniques.

If several such optical measuring sections are configured along the possible path of motion of the occupant 35, then the velocity of the occupant relative to the passenger cabin can also be established. This measurement is obtained in a relatively simple manner by taking a positional fix through the use of several measuring sections, and by making a time determination while the motor vehicle occupant 35 moves from one measuring section to another. Based on this information, the velocity of the motor vehicle occupant 35 is calculated.

In another exemplified embodiment of the present invention, the position sensor S2 comprises one ultrasonic transmitter 32 and one ultrasonic receiver 33. The ultrasonic transmitter 32 and receiver 33 are arranged with respect to the motor vehicle occupant 35, so that the ultrasonic energy from the ultrasonic transmitter 32 is reflected off of the occupant 35 and onto the ultrasonic receiver 33. The ultrasonic receiver 33 is coupled to the control instrument 10. Using this arrangement, a simple determination of the position of the motor vehicle occupant 35 is possible. The ultrasonic transmitter 32 and the ultrasonic receiver 33 are depicted in FIG. 2 as being spatially separated. However, it is also possible to combine both components into a single subassembly 34 which is coupled to the control instrument 10.

In addition to the previously described sensors S2 for determining position, other sensors can optionally be installed. Such sensors S2 may be designed, for example, as active or passive infrared sensors. In another embodiment of the present invention, microwave radar sensors are used as the position sensors S2. Thus, a microwave transmitter 32 transits waves toward the occupant 35, which are reflected onto a microwave receiver 33 which is, in turn, coupled to the control instrument 10. With these types of sensors, the presence, the position, and/or the velocity of motion of the motor vehicle occupant 35 relative to the passenger cabin can be quickly determined. Such quick determinations are possible since only a short evaluation time is required.

In one embodiment of the apparatus of the present invention, the position sensor S2 is configured in the dashboard of the motor vehicle in front of the motor vehicle occupant 35, as indicated by 32 and 33 in FIG. 2. This configuration has the advantage of providing particular ease of assembly, since only short connecting lines to the control instrument 10 are needed.

In another embodiment of the present invention, the position sensor S2 is located in the head rest of a motor vehicle seat. In this manner, it can easily be determined if the motor vehicle occupant is sitting in close contact with the back of the seat and, thus, in a position which is optimal for the protective function of the respective safety means 18.

The functional sequence of the operation of the method and apparatus of the present invention is hereinafter described with reference to the flow chart of FIG. 3. As illustrated in FIG. 3, the process begins with the process step 100. The acceleration a, which is the acceleration that the motor vehicle is subjected to, is first measured in process step 101 by the acceleration sensor S1. In process step 102, the acceleration a is checked to determine whether it has exceeded a specified limiting acceleration value aG. In process step 104, the position of the occupant 35 and/or the relative velocity of the occupant 35 with respect to the passenger cabin is detected by the position sensor S2 using the measuring techniques described above.

In step 105, the measured values detected by the position sensor S2 are checked to determine whether they indicate a dangerous situation for the occupant 35. Indications of a dangerous situation can include a forward displacement of the occupant 35. Dangerous situations are particularly indicated by a forward displacement of the head or upper body region of the occupant 35, or by exceeding a specified limiting value of the relative velocity of the occupant in the driving direction of the motor vehicle. The position of the occupant 35 is detected using measuring techniques by means of the position sensors S2, as described above.

The relative velocity of the occupant 35 can likewise be determined in a simple manner by means of the position sensor S2. The position sensor S2 detects several positional values of the motor vehicle occupant 35. A determination is made as to the time that elapses from when a first positional value is received up to the present positional value or, i.e., the positional value which follows.

If the position and/or the relative velocity of the motor vehicle occupant 35 and/or the output signal of the acceleration sensor S1 indicate the occurrence of an accident, the circuit element 11 is triggered by the control instrument 10 and the ignition circuit is closed, as indicated in step 109. As a result, the firing element 14 is heated by the current flow and thus activated and, in turn, causes the safety means 18 to be released. In process step 112, the functional sequence provided for protecting the motor vehicle occupant 35 is concluded.

We claim:

1. A method for protecting motor vehicles occupants, comprising the following steps:
   generating a first signal indicative of the acceleration of the motor vehicle;
   measuring the position of a passenger seated in the motor vehicle and generating a second signal indicative of the measured position of the passenger seated in the motor vehicle; and
   comparing the value of the first signal to a first threshold value indicative of a threshold acceleration value of the motor vehicle, and comparing the value of the second signal to a nominal value indicative of a nominal seating position of the occupant within the motor vehicle, and actuating a safety device for protecting the occupant in the event of a vehicle collision upon the first signal exceeding the threshold value and the second signal deviating from the nominal value.

2. A method for protecting motor vehicle occupants, comprising the following steps:
   generating a first signal indicative of the acceleration of the motor vehicle;
   generating a second signal indicative of the position of a passenger seated in the motor vehicle;
   generating a third signal indicative of the velocity of the occupant relative to the passenger cabin of the vehicle;
   comparing the value of the first signal to a first threshold value indicative of a threshold acceleration value of the motor vehicle, comparing the value of the second signal to a nominal value indicative of a nominal seating position of the occupant within the motor vehicle, and comparing the value of the third signal to a second threshold value, and actuating a safety device for protecting the occupant in the vehicle upon the first signal exceeding the first threshold value, and either the second signal deviating from the nominal value or the third signal exceeding the second threshold value.

3. An apparatus for protecting motor vehicle occupants, comprising:
   first means for generating a first signal indicative of the acceleration of the motor vehicle;
   second means for measuring the position of an occupant seated in the motor vehicle and generating a second signal indicative of the measured position of the occupant seated in the motor vehicle; and
   third means coupled to the first and second means for receiving the first and second signals, respectively, therefrom, and for comparing the value of the first signal to a first threshold value indicative of a threshold acceleration value of the motor vehicle, and for comparing the value of the second signal to a nominal value indicative of a nominal seating position of the occupant within the motor vehicle, and for actuating a safety device for protecting the occupant in the event of a vehicle collision upon the first signal exceeding the threshold value and the second signal deviating from the nominal value.

4. An apparatus for protecting motor vehicle occupants, comprising:
   first means for generating a second signal indicative of acceleration of the motor vehicle;
   second means for generating a second signal indicative of the position of an occupant seated in the motor vehicle;
   third means coupled to the first and second means for receiving the first and second signals respectively, and for comparing the value of the first signal to a first threshold value indicative of the threshold acceleration value of the motor vehicle, and for comparing the value of the second signal to a nominal value indicative of a nominal seating position of the occupant within the motor vehicle; and
   fourth means for transmitting a third signal to the third means indicative of the velocity of an occupant relative to the passenger cabin of the vehicle, the third means being adapted to compare the value of the third signal to a second threshold value and for actuating a safety device for protecting the occupant in the vehicle upon the fist signal exceeding the first threshold value and either the second signal deviating from the nominal value or the third signal exceeding the second threshold value.

5. An apparatus as defined in claim 4, wherein the second means generates second signals indicative of the position of the upper body of an occupant of the vehicle.

6. An apparatus for protecting motor vehicle occupants, comprising:
   first means for generating a first signal indicative of the acceleration of the motor vehicle;
   second means for generating a second signal indicative of the position of an occupant seated in the motor vehicle;
   third means coupled to the first and second means for receiving the first and second signals, respectively, and for comparing the value of the first signal to a first threshold value indicative of a threshold acceleration value of the motor vehicle, and for comparing the value of the second signal to a nominal value indicative of a nominal seating position of the occupant within the motor vehicle, and for actuating a safety device for protecting the occupant in the event of a vehicle collision upon the first signal exceeding the threshold value and the second signal deviating from the nominal value, wherein the second means includes at least one light transmitter and at least one light receiver coupled to the third means, the light transmitter and light receiver thus defining at least one measuring section therebetween, the measuring section being oriented substantially at a right angle with respect to the direction of motion of an occupant during a collision, the light receiver thus being adapted to transmit a second signal to the third means upon the occupant crossing the measuring section.

7. An apparatus for protecting motor vehicle occupants, comprising:

first means for generating a first signal indicative of the acceleration of the motor vehicle;

second means for generating a second signal indicative of the position of an occupant seated in the motor vehicle;

third means coupled to the first and second means for receiving the first and second signals, respectively, and for comparing the value of the first signal to a first threshold value indicative of a threshold acceleration value of the motor vehicle, and for comparing the value of the second signal to a nominal value indicative of a nominal seating position of the occupant within the motor vehicle, and for actuating a safety device for protecting the occupant in the event of a vehicle collision upon the first signal exceeding the threshold value and the second signal deviating from the nominal value, wherein the second means includes at least one ultrasonic transmitter and at least one ultrasonic receiver coupled to the third means, the ultrasonic transmitter being adapted to transmit ultrasonic energy toward an occupant of the vehicle, the ultrasonic energy being reflected off the occupant and, in turn, transmitted to the ultrasonic receiver, the ultrasonic receiver being adapted to transmit a second signal to the third means indicative of the position of the occupant based thereon.

8. An apparatus for protecting motor vehicle occupants, comprising:

first means for generating a first signal indicative of the acceleration of the motor vehicle;

second means for generating a second signal indicative of the position of an occupant seated in the motor vehicle;

third means coupled to the first and second means for receiving the first and second signals, respectively, and for comparing the value of the first signal to a first threshold value indicative of a threshold acceleration value of the motor vehicle, and for comparing the value of the second signal to a nominal value indicative of a nominal seating position of the occupant within the motor vehicle, and for actuating a safety device for protecting the occupant in the event of a vehicle collision upon the first signal exceeding the threshold value and the second signal deviating from the nominal value, wherein the second means includes at least one microwave transmitter and at least one microwave receiver coupled to the third means, the microwave transmitter being adapted to transmit waves toward an occupant of the vehicle, the waves being reflected off the occupant, and, in turn, transmitted to the microwave receiver, the microwave receiver being adapted to transmit a second signal to the third means indicative of the position of the occupant based thereon.

9. An apparatus for protecting motor vehicle occupants, comprising:

first means for generating a first signal indicative of the acceleration of the motor vehicle;

second means located within the dashboard of the motor vehicle for generating a second signal indicative of the position of an occupant seated in the motor vehicle; and third means coupled to the first and second means for receiving the first and second signals, respectively, and for comparing the value of the first signal to a first threshold value indicative of a threshold acceleration value of the motor vehicle, and for comparing the value of the second signal to a nominal value indicative of a nominal seating position of the occupant within the motor vehicle, and for actuating a safety device for protecting the occupant in the event of a vehicle collision upon the first signal exceeding the threshold value and the second signal deviating from the nominal value.

* * * * *

UNITED STATES PATENT AND TRADEMARK OFFICE
CERTIFICATE OF CORRECTION

PATENT NO. : 5,118,134
DATED : June 2, 1992
INVENTOR(S) : Mattes et al.

It is certified that error appears in the above-identified patent and that said Letters Patent is hereby corrected as shown below:

Column 3, line 40, change "this charge" to --this context, an operative connection means that a propellant charge--.
Column 6, line 26, change "second" to --first--.
Column 6, line 35, change "the" to --a--.

Signed and Sealed this

Fifteenth Day of March, 1994

Attest:

BRUCE LEHMAN

*Attesting Officer*    *Commissioner of Patents and Trademarks*